Figure 1:
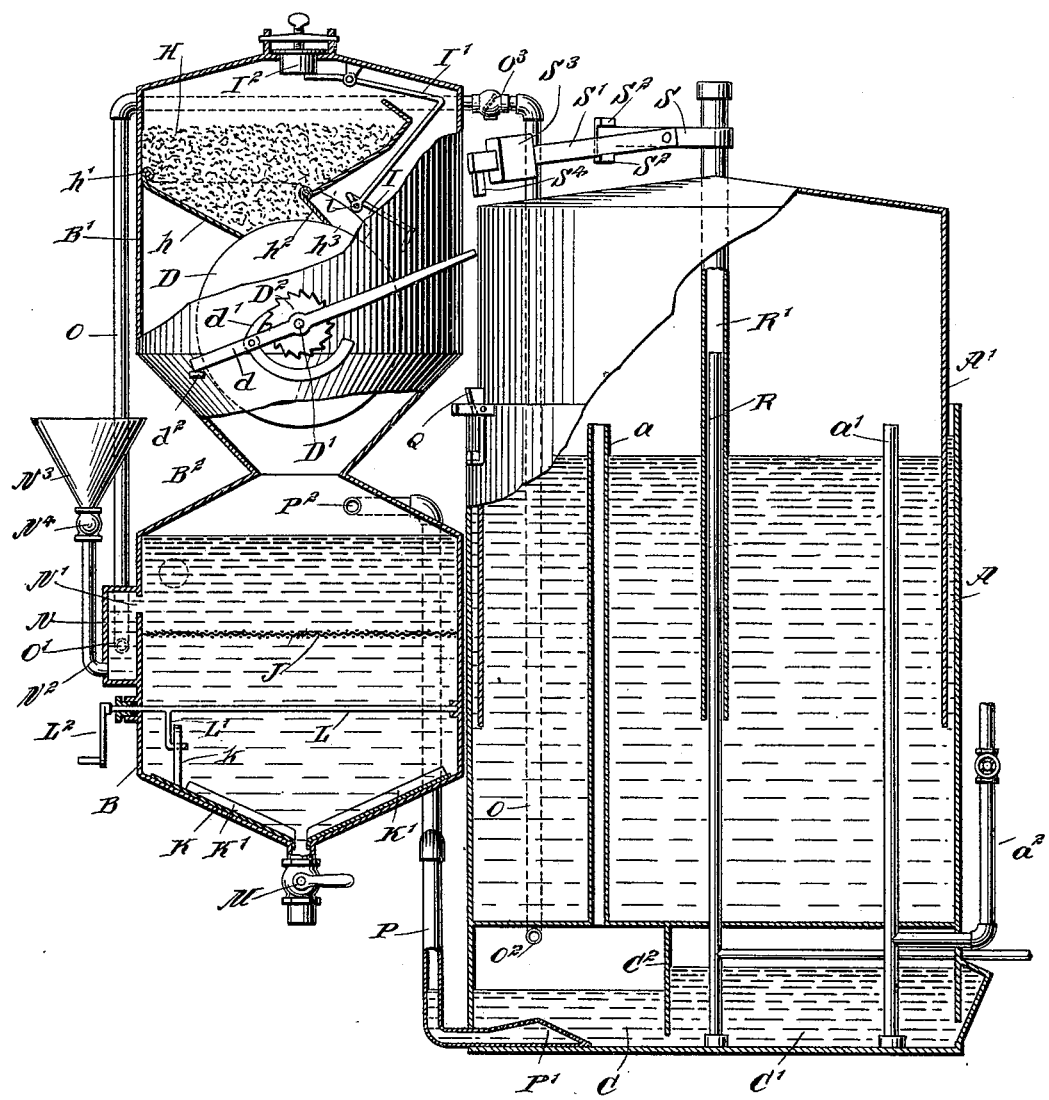

No. 643,555. Patented Feb. 13, 1900.
C. C. STEWART & G. C. UPDEGRAFF.
ACETYLENE GAS GENERATOR.
(Application filed May 4, 1899.)

(No Model.) 2 Sheets—Sheet 1.

WITNESSES:
Edward Thorpe
F. L. Reynolds.

INVENTORS
C. C. Stewart
BY G. C. Updegraff
ATTORNEYS.

No. 643,555. Patented Feb. 13, 1900.
C. C. STEWART & G. C. UPDEGRAFF.
ACETYLENE GAS GENERATOR.
(Application filed May 4, 1899.)
(No Model.) 2 Sheets—Sheet 2.
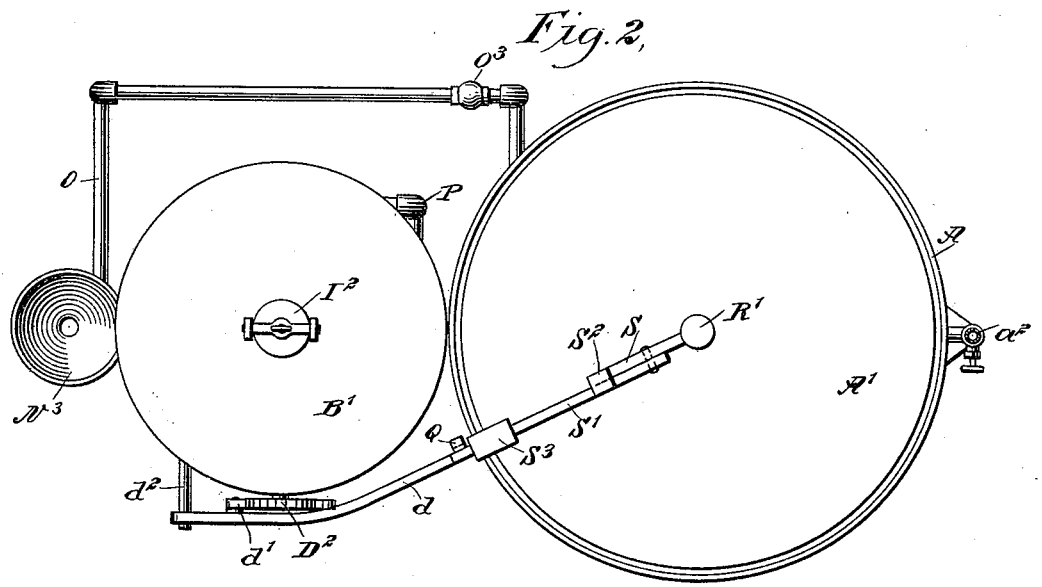
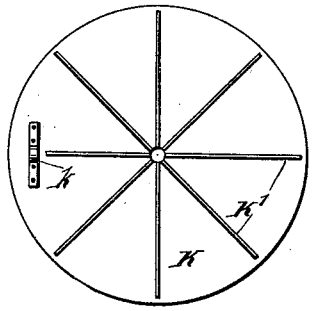
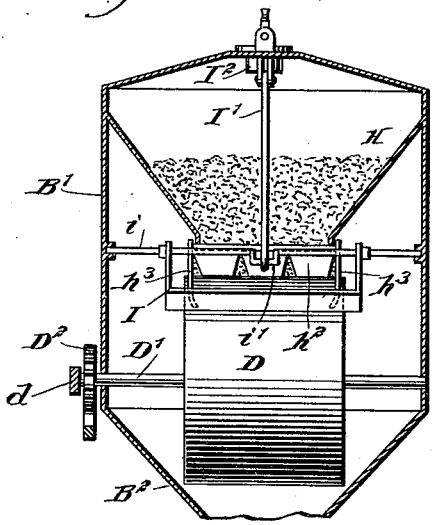

UNITED STATES PATENT OFFICE.

CHARLES CLINTON STEWART AND GEORGE CORODE UPDEGRAFF, OF HUTCHINSON, KANSAS.

ACETYLENE-GAS GENERATOR.

SPECIFICATION forming part of Letters Patent No. 643,555, dated February 13, 1900.

Application filed May 4, 1899. Serial No. 715,553. (No model.)

*To all whom it may concern:*

Be it known that we, CHARLES CLINTON STEWART and GEORGE CORODE UPDEGRAFF, of Hutchinson, in the county of Reno and State of Kansas, have invented a new and Improved Acetylene-Generator, of which the following is a full, clear, and exact description.

Our invention relates to improvements in acetylene-generators of that class in which the carbid is discharged in small quantities into an excess of water.

Our invention comprises the novel features which will be hereinafter described and claimed.

Reference is to be had to the accompanying drawings, forming a part of this specification, in which similar characters of reference indicate corresponding parts in all the views.

Figure 1 is a sectional elevation of our device. Fig. 2 is a top plan view. Fig. 3 is a sectional elevation taken through the upper part of the generator at right angles to the section shown in Fig. 1, and Fig. 4 is a plan of the false bottom upon which the lime or sludge is received.

Our apparatus is of that type in which a gasometer is used, consisting of a tank A and a rising and falling bell A', the tank being filled with water, which will form a water seal, and the generator is of that type which has a body of water, in its lower portion and a carbid-holder in its upper portion, from which the carbid is fed in small quantities into the water beneath by means of apparatus operated by the rise and fall of the gasometer-bell.

The generator is constructed of two principal parts—the lower cylinder B, containing water, and the upper cylinder B', which contains the carbid holder or hopper and the mechanism by which the carbid is fed into the water in the lower cylinder B. These two portions are connected with each other by means of the conical portions $B^2$, the upper one of which serves to deflect the carbid, so as to discharge it centrally into the water in the lower portion of the generator. The lower portion or water-tank B of the generator is provided with a sieve J, forming a support for the carbid until it has been reduced to lime, the lime then falling through the spaces in the sieve and being received by a false bottom or sludge-stirrer K, said false bottom being of conical shape, having an opening at its apex communicating with a discharge-pipe having a valve M. This false bottom has radial ribs K' projecting slightly above its surface and an arm $k$, by means of which it may be oscillated or stirred in order to loosen the lime deposited thereon and cause it to flow downward and out through the discharge-valve M. The central portion of the false bottom K is preferably provided with downwardly-extending lips or flanges which enter the discharge-opening, forming thereby a pivot to hold the bottom in position while being oscillated. This false bottom is given an oscillating movement by means of a shaft L, which extends through one side of the generator and is provided at its outer end with an operating-crank $L^2$ and within the generator with a crank L', which engages the arm $k$ upon the false bottom K. By this means it is possible to give the false bottom K an oscillating movement which will stir up the lime or sludge deposited thereon and cause it to flow freely to the discharge-valve.

In the upper portion of the upper cylinder B', forming a part of the generator, is a hopper H, within which the carbid is placed. The carbid is introduced to the hopper through an opening formed in the upper end of this chamber and normally closed by a plug $I^2$, which is held tightly in place by any suitable mechanism. The lower portion of this hopper is closed by a chute $h$, which is pivoted at one end at $h'$, so that it may have a slight up-and-down movement. The opposite end $h^3$ of the chute has no bottom and rests upon a drum or cylinder D, mounted to turn upon a shaft D' within the cylinder B', and is of such size as to close the opening in the end of the chute and prevent the carbid from being discharged therefrom. The upper edge of the drum D does not reach quite up to the lower portion of the opening in the hopper, so that when the drum is rotated in one direction it will carry a portion of the carbid laterally until it is discharged over the side of the drum and into the water beneath. This space between the drum and the lower edge of the opening in the hopper is closed by a series of swinging gates $h^2$, which will yield to the carbid upon the drum when the drum is turned.

The drum D is given a turning movement by means of an apparatus which is actuated by the fall of the gasometer-bell A'. This apparatus comprises a ratchet-wheel $D^2$, secured to the end of the shaft D' which projects outside the cylinder B'. Upon this same shaft is pivoted a lever $d$, which is counterweighted to automatically return it to its normal position and which carries a pawl $d'$, engaging the ratchet-wheel $D^2$, and having one end thereof placed beneath one end of a weighted lever which is carried by the gasometer-bell. This lever is formed in two parts, one part S consisting of an arm fixedly secured to the gasometer-bell and having limiting-stops $S^2$ on its outer ends lying one upon each side of an extension S' of said lever. This extension is pivoted to the arm S and is limited in its up-and-down movement by the stops $S^2$. The portion S' of said lever has a weight $S^3$ thereon, which may be made movable, so as to properly adjust the weight on the lever to the work to be done. This lever S S' is so placed that it will engage the outer or swinging end of the lever $d$ when the gasometer-bell falls, thus turning the drum D, so as to discharge a quantity of carbid into the water beneath. It is possible that in some cases the amount of carbid which is thus discharged into the water beneath will only be sufficient to generate gas fast enough to replace the gas which is being consumed and that in consequence the gasometer-bell will not rise. To prevent the possibility of the device running down from this cause, a secondary device has been introduced. This consists of a fixed stop Q, which is so placed that it will engage the outer end extension S' or, as herein shown, a downward projection $S^4$, which is secured to the outer end thereof. This stop is so placed that it will engage said extension S' when the bell is near the lower limit of its fall and will thus temporarily prevent the extension from falling with the gasometer-bell as it continues its downward movement. It will be noticed that the extension S' is normally in an inclined position, the outer end thereof being lower than the pivot. As a result of the continued fall of the gasometer-bell and the checking of the arm $S^4$ by contact with the stop Q the arm or bar S' will be brought to a horizontal position, in which position the arm $S^4$ will be a greater than the normal distance from the center or sufficient to cause it to be disengaged from the stop Q. This is due to the fact that the normal horizontal distance of the arm $S^4$ from the pivot of the bar S' is equal to the cosine of its angle with the horizontal, and the distance when the bar S' is horizontal is equal to the radius, and the cosine, except at one limit, is less than the radius. When this happens, the arm S' will suddenly drop and being in engagement with the lever $d$ will move it quickly through a sufficient distance to cause a sudden feed of a considerably-increased quantity of the carbid. This will cause a sudden increased generation of acetylene sufficient to insure the rise of the bell A'.

The gas is conveyed from the generator to the gasometer by means of a pipe P, which is connected with the generator at the point $P^2$ and discharges into a separate chamber C, formed in the lower portion of the tank A. This discharge is through a perforated head P', which is covered with water. This lower portion of the tank is divided into two compartments C and C' by means of a partition $C^2$, which extends downwardly to a point near the bottom of the tank. The gas is conveyed from the chamber C to the gasometer proper through a pipe $a$, which extends upwardly until above the surface of the water in the gasometer. The gas is conveyed away from the gasometer through a pipe $a'$, which connects outside the tank with the service-pipe $a^2$, which is provided with a suitable valve, by means of which it may be closed when desired. An overproduction of gas in the gasometer is provided for by means of a blow-off, which consists of a pipe R, extending upwardly in the gasometer and normally covered by means of a pipe R', which prevents the discharge of gas until the lower end of the pipe R' rises above the level of the water in the gasometer. The discharge of carbid from the hopper while the same is opened for refilling is prevented by means of a plate which is mounted upon the end of swinging arms I and which is adapted to drop downwardly upon the surface of the drum D, thus preventing any carbid from dropping into the water. This plate is controlled by the insertion or removal of the plug $I^2$, which must be removed when the hopper is to be filled. This plug projects a short distance inside the cylinder B' and engages one end of a lever I', which is pivoted within this cylinder and which is connected with the crank $i'$, formed upon the pivot-shaft $i$, which carries the arms I and said plate. When the plug $I^2$ is removed, this plate will drop upon the drum and prevent the discharge of carbid. When the plug $I^2$ is inserted, the plate will be lifted from contact with the drum and permit the discharge of any carbid which is held back thereby.

Water is introduced to the generator through an auxiliary filling-chamber N, which is secured to one side of the generator and communicates therewith by an opening N', located at the top of the auxiliary chamber and beneath the normal water-level in the generator. A pipe $N^2$ is connected with the bottom of the auxiliary or filling chamber and extends upwardly, being provided with a check-valve $N^4$, which freely permits air or water to flow inwardly or toward the generator, but which will close against a flow of water or gas outwardly. A funnel $N^3$ is provided by which water may be conveniently poured into said pipe and thus introduced into the chamber. An equalizing-pipe is connected with this auxiliary or filling chamber and the gas-space of the gasometer. This pipe O connects with the auxiliary chamber at a point intermediate the connection of the filling-pipe N² and the opening N', communicating with the generator. This pipe is preferably carried upward to a point considerably above the level of the water in the generator to prevent the possibility of siphoning water through this pipe. The pipe is then carried downwardly and is connected with the chamber C, as shown at O². A check-valve O³ is placed at any convenient point in this pipe, so as to permit gas to flow from the gasometer to the generator, but to prevent flow of water in the opposite direction, thus making another safeguard against siphoning the water from the chamber N.

If the water-level in the generator should be lowered either while cleaning the generator or by consumption of gas, the filling-chamber N is kept substantially full of water, and the gas from the gasometer will enter through the pipe O before air will enter from the outside through the filling-pipe N². This will occur even if the pressure of gas in the gasometer is only that of the atmosphere, as the depth of seal for the opening O' of said pipe O is less than that of the pipe N². When the gas in the gasometer is under pressure, this will be more thoroughly insured.

Having thus described our invention, we claim as new and desire to secure by Letters Patent—

1. A carbid-feeding device, comprising a hopper, a chute hinged at one end, and a feed-wheel upon which the chute rests and by which the open end of the chute is closed, substantially as described.

2. A carbid-feeding device for acetylene-generators, comprising a feed wheel or drum, a hopper, a chute hinged at one end and having the other end open and resting upon the feed wheel or drum, and a hinged gate closing said open end of the chute and swinging outwardly.

3. A carbid-feeding mechanism, comprising a hopper, a movable plate adapted to check the flow from the hopper, a movable cover for the hopper, a lever adapted to be engaged and depressed by the cover when put in place, and connections therefrom to said plate whereby it is lifted to free the flow of carbid when the hopper-cover is put in place.

4. A carbid-feeding device for acetylene-generators, comprising a hopper, a feed wheel or drum placed to normally check the flow from the hopper, means for turning said wheel to feed the carbid, a plate hinged to swing down upon the wheel and prevent the feed of the carbid, and means for holding said plate elevated.

5. A carbid-feeding device for acetylene-generators, comprising a hopper, a feed wheel or drum placed to check the flow from the hopper, means for turning said wheel to feed the carbid, a plate hinged to swing downward upon the wheel and prevent feeding of the carbid, a removable cover for the hopper, a lever adapted to be engaged and depressed by the cover when put in place, and connections from said lever to the plate, whereby it is lifted to permit the feeding of carbid when the hopper-cover is put in place.

6. A carbid-feeding device for acetylene-generators, comprising a hopper having a chute leading therefrom, hinged at its upper end, the other end of the chute having its bottom removed and with its edges resting upon a feed-wheel, a feed-wheel closing said bottom opening in the chute, and means for turning the wheel.

7. A carbid-feeding device for acetylene-generators, comprising a hopper, a chute leading therefrom and having its bottom removed at its lower end, a movable member closing said bottom opening and adapted to be actuated to feed the carbid, and a series of swinging gates placed in line across the chute and swinging independently.

8. A carbid-feeding device for acetylene-generators, comprising a hopper, a chute leading therefrom and pivoted at its upper end, said chute having its bottom removed at its lower end, a movable member closing said bottom opening and adapted to be actuated to feed the carbid, and a series of swinging gates placed in line across the chute and swinging independently.

9. A carbid-feeding device for acetylene-generators, comprising a hopper, a chute leading therefrom and pivoted at its upper end, said chute having its bottom removed at its lower end, a feed-drum closing said opening, means for turning the drum, and a series of swinging gates placed in line across the chute and over the drum and swinging independently.

10. An acetylene-generator, having a valve-controlled discharge-opening, a conical false bottom adapted to receive the lime and having an aperture at its apex leading to said discharge-opening, and means by which said false bottom may be given an oscillating movement about its center.

11. An acetylene-generator, having a valve-controlled discharge-opening, a conical false bottom adapted to receive the lime and having an aperture at its apex leading to said discharge-opening, a central vertical pivot for the false bottom, radial ribs on the upper side of said false bottom, and means for oscillating the bottom on its pivot.

12. An acetylene-generator, having a valve-controlled discharge-opening, a conical false bottom adapted to receive the lime and having an aperture at its apex leading to said discharge-opening, a pivot for said false bottom, radial ribs on the upper side of this bottom, a shaft extending through the side of the generator and having an external operating-crank, and an internal crank engaging the false bottom to oscillate it.

13. An acetylene-generating device, comprising a gasometer having a rising and falling bell, a generator having a carbid-feeding device provided with a feed-operating arm, an arm pivoted to the gasometer-bell and engaging the feed-operating arm to actuate it as the bell falls, stops limiting its drop relative to the bell, and a fixed stop engaging said arm to check its fall, and freeing the arm as it is moved horizontally by the continued fall of the bell.

14. A carbid-feed for acetylene-generators, comprising a generating-chamber having a feeding mechanism operated by a lever, a rising and falling gasometer-bell, an arm pivoted thereon and engaging the feed-operating lever to operate it, and a fixed stop engaging and temporarily retracting the arm, said lever and arm being connected by the horizontal movement of the arm due to the continued fall of the bell, whereby the feed mechanism is given a sudden movement.

15. A feeding mechanism for acetylene-generators, comprising a generating-chamber, a feeding device therein having an internally-operating lever, a rising and falling gasometer-bell, an arm pivoted thereon and engaging the feed-operating lever to actuate it, and means for checking and temporarily holding said lever while the bell is falling through a short space near the bottom, and for releasing it again when it passes a certain point in its continued fall.

16. A water-supply device for acetylene-generators, comprising an auxiliary chamber alongside of the generator and communicating therewith near its top and below the normal water-level in the generator, a filling-pipe connected with the auxiliary filling-chamber near its bottom, a pipe connecting the middle portion of the auxiliary chamber with the gas-spaces of the gasometer and having intermediate its ends an upwardly-extending loop, and a check-valve in said pipe opening toward the generator.

17. A water-supply device for acetylene-generators, comprising an auxiliary chamber alongside of the generator and communicating therewith near its top and below the normal water-level in the generator, a filling-pipe connected with the auxiliary filling-chamber near its bottom, and a pipe connecting the middle portion of the auxiliary chamber with the gas-spaces of the gasometer and having intermediate its ends an upwardly-extending loop.

CHARLES CLINTON STEWART.
    GEORGE CORODE UPDEGRAFF.

Witnesses:
 L. J. WHITE,
 LINCOLN STEWART.